April 12, 1932.　　F. CUVILLIER　　1,854,112
BEET PULLING AND CUTTING APPARATUS
Filed Jan. 24, 1930　　2 Sheets-Sheet 1
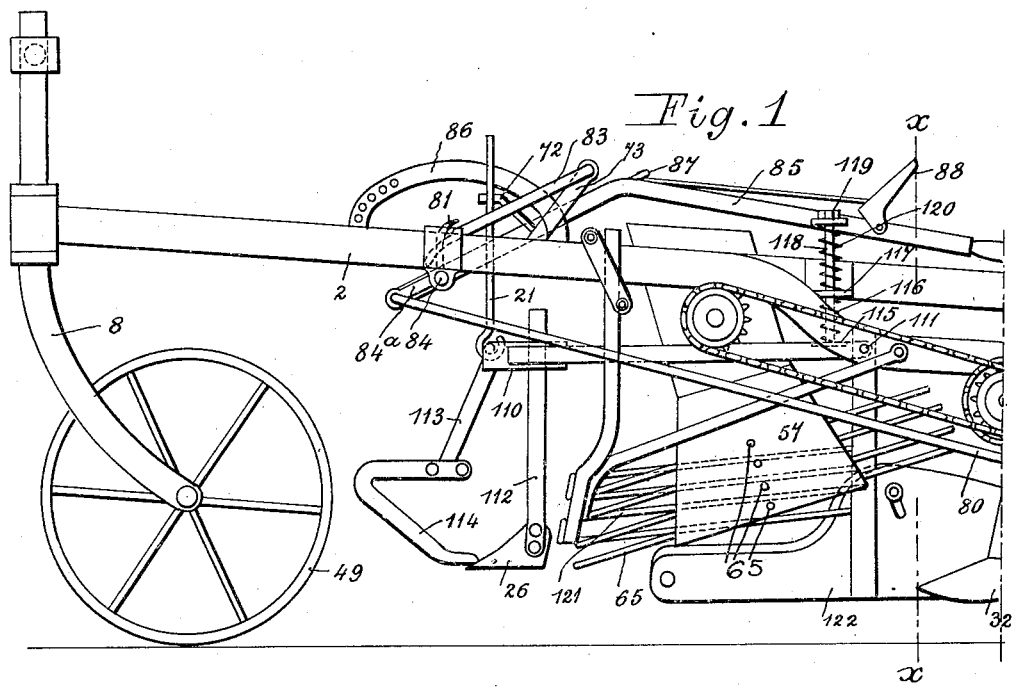
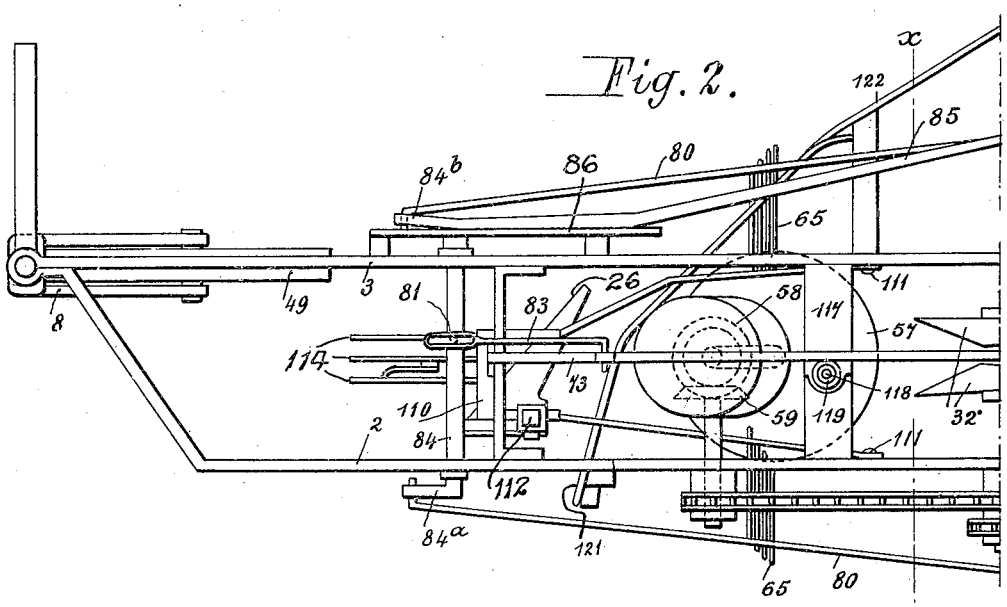
INVENTOR
F. Cuvillier
By Lacey & Lacey,
Attys

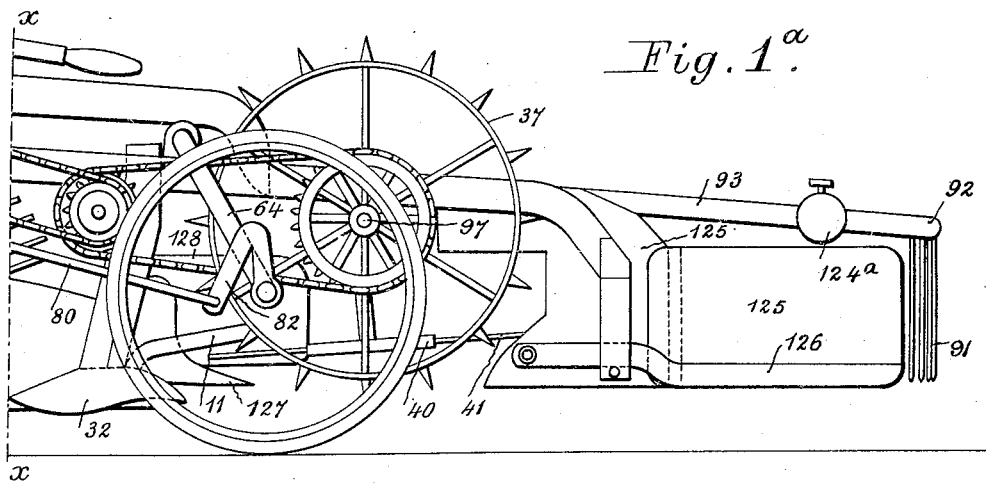
Fig. 1ª
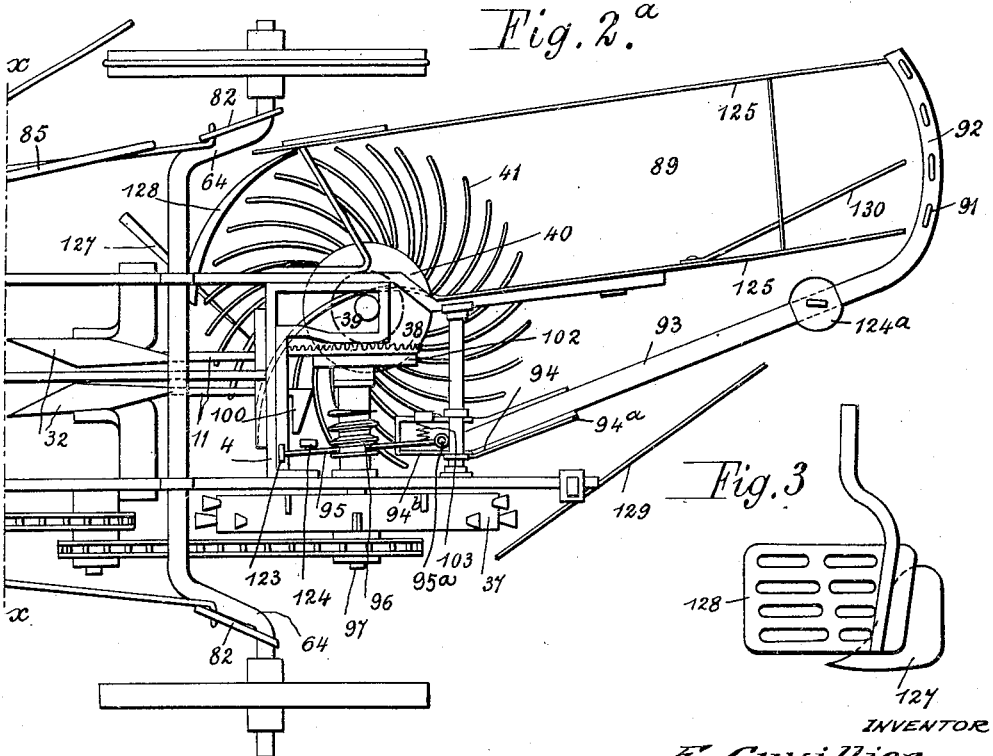
Fig. 2ª
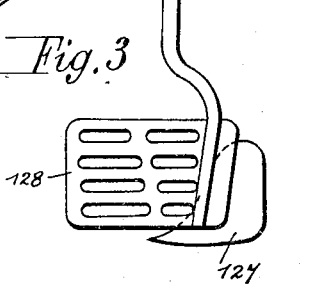
Fig. 3
INVENTOR
F. Cuvillier.
By Lacey & Lacey,
Attys Patented Apr. 12, 1932

1,854,112

UNITED STATES PATENT OFFICE

FRANÇOIS CUVILLIER, OF BAPAUME, FRANCE

BEET PULLING AND CUTTING APPARATUS

Application filed January 24, 1930, Serial No. 423,122, and in France January 29, 1929.

The present invention relates to a machine adapted for pulling beets from the ground, cutting off the tops or stalks, and properly arranging the beets and stalks in piles or rows, all in a single operation, in such manner that the stalks will be discharged to one side and ground will be made level at the furrows produced by the pulling, the beets being also disposed in piles which are regu10 larly spaced and are at a sufficient distance apart to allow the transporting vehicles to circulate between them.

To this effect, the said machine comprises cutter guides adapted to slide upon the top part of the beets and mounted, together with the stalk-cutting knife, upon a frame or structure pivoting upon the main frame of the machine, and balanced in an elastic manner in both directions. The stalks or leafy parts are taken up by a toothed drum and delivered to an apertured channel device or separator and are then finally discharged to the ground on one side of the machine by an imperforate separator. The beet-pulling blades or shares are extended to the rear by suitable branches which facilitate the ascent of the beets and deliver them upon rotatable paddles or blades actuated by a sprocket wheel which controls all the movements of the ma30 chine.

The said blades cooperate with a channel device or separator, in such manner that the beets will be delivered into a bottomless basket disposed at the rear of the machine and consisting of two pivoting side walls, and of a rear wall formed by a vertical rake which is pivoted to the machine frame and is subjected—by means of an arm secured to said frame—to a periodic lifting action caused by the said sprocket wheel, in such manner that the beets contained in the said basket will be left on the ground in the form of a pile.

Special blades or shares acting at the ground level, restore the earth to the furrow produced by the removal of the beets, thus leveling off the ground.

To reduce the space required for turning the vehicle about, the front rolling portion consists of a single wheel mounted in a pivoting fork which is controlled by the driver's lever.

To raise from the ground the various operating devices, the machine frame is also mounted upon a crank axle which can be turned by a lever provided with handle, which is pivotally mounted on the said frame at the front part of the machine and is provided with fastening or locking means; said lever is connected to the vehicle axle by suitable rod and link gear, and it serves to raise the knife-carrying frame.

By this means, the controlling lever can be disposed on the left hand side of the vehicle within the driver's reach, so that he is enabled at any time and with a small effort, to raise the machine out of action or to allow it to descend for operation, and hence the driver's task is much facilitated.

The accompanying drawings show by way of example an embodiment of the invention.

Figs. 1 and 1a are side views of the front and rear portions of the machine respectively, the line X—X indicating the line of division between the two figures.

Figs. 2 and 2a are plan views of the machine at front and rear of the line X—X respectively.

Fig. 3 is a side view of the beet-separator.

The machine comprises a main frame consisting of two side beams 2—3, connected at the rear by a double right-angled member 4; the beam 2 is bent laterally at the front part so that it may be united with the beam 3 and form a socket or sleeve bearing for the fork 8 carrying the front wheel 49.

At the front end of a frame 110, pivoted to the said beams 2—3 by axles 111, is mounted a support 112, vertically adjustable, carrying the cutting knife 26. The said frame also carries, in front of the said support 112, a fork-shaped arm 113 to which are secured suitably inclined guides 114 which make contact with the top part of the beet in order to regulate the height at which the cutting operation is effected. From the frame 110 rises a rod 21 which is pinned or otherwise connected to the arm 72 of a two arm lever 72—73 actuated by an arm 83 adapted to lift the machine, and thus the knife and its guides will be raised from the ground when the machine is travelling on the road.

The frame 110 also carries a cross-piece 115 adapted to bear—by means of a spring 116—upon an upper cross bracing member 117 forming part of the main frame: said frame 110 is provided with a rod 118 which guides the said spring and also carries a nut 119, in contact with a spring 120 applied upon the cross-piece 117.

Thus the movements of the frame 110 are impeded in both directions, and the said frame will rapidly assume its mean position, which latter is adjusted at will by the nut 119. Since the spring 120 supports the weight of the frame 110, it must be stronger than the spring 116.

In the rear of the knife is disposed a separator provided with a gate or grating 121 consisting of vertically spaced parallel rods secured at the left side of the machine and extending across the machine and rearwardly, the opposite ends of the rods being free and the teeth 65 of a toothed drum 57 being disposed to work through the spacer between the rods.

The leafy parts or stalks are drawn forward by the said drum and are thus delivered upon an imperforate separator 122 which drops them outside of the path of the machine.

The main frame of the machine is mounted upon a crank axle 64 which is provided with two wheels. Two rods 80 are connected to the ends of said axle by arms 82 secured to the latter, and both cooperate at the front of the machine with a shaft 84, termed raising shaft, which is rotatable on the side beams of the vehicle and is bent at right angles at its ends at 84a and 84b. The said shaft 84 is secured to an operating lever 85 provided with fastening means consisting of a perforated or toothed quadrant 86 disposed at the front part of the machine, cooperating with a latch 87 controlled by a handle 88 which is pivoted upon the lever 85.

The apparatus is operated in a very simple manner. Any action upon the lever 85 is imparted—through the axle 84 and the arms 84a and 84b—to the rods 80 thus obtaining by means of the arms 82 a corresponding rotation of the axle 64, and thus the machine can be raised, or can be lowered for operation, with different degrees in these positions, corresponding to the different positions in which the lever 85 can be held upon its quadrant.

Since the devices controlling the crank axle are disposed at the front and on the right hand side of the machine, this will much facilitate the control of the machine by the operator who walks at the left hand side of the machine and is enabled, without ceasing to drive his team, to raise or lower at will the rear part of the beet-pulling apparatus according to circumstances.

At the same time, the rotation of the shaft 84 produces, by means of a finger or stud 81 thereon, the rocking of the arm 83 connected to one arm of the two-arm lever 72—73, so that the frame 110 is also raised together with the knife and its guides. The finger or stud 81 works in a longitudinal slot in the front end of the arm 83 so that it has a lost motion connection therewith and will move the arm in one or the opposite direction accordingly as it engages the front or rear end of the slot. Fig. 1 shows the machine raised. If the levers 85 be raised, the arm 83 will be moved forwardly and all of the parts moved correspondingly so that the arch of the axle will be swung downward to lower the working mechanism.

The stalk-discharging drum 57 is provided with radial pins or teeth 65 disposed in groups of four, superposed in two diametrical perpendicular planes; said drum is driven by two bevel gear wheels 58—59 actuated by a ground wheel 37 by means of chains or the like.

On the main frame are mounted, back of the cutting devices, two beet-pulling blades or shares 32 followed by ramps 11 for the upward travel of the beets, which are thus brought upon a discharging device consisting of a disk 40 provided on its periphery with curved elastic blades 41; said device is rotated from the shaft 97 of the wheel 37 by means of bevel gearing 38—39, the bevel gear 38 being secured on the inner end of the shaft 97 and the gear 39 being at the upper end of the shaft of the disk 40 and meshing with the gear 38 above the shaft 97. The said disk 40 propels the beets along a curved channel 128 leading to a collecting basket 89.

When leaving said pulling blades, the beets proceed in the first place above the pointed end of a device 127 (Fig. 3) which serves to restore the earth to the furrow which is formed when the beets are drawn out.

On the other side of the machine is mounted a channel device or leveler 129 by which the earth is also brought into the furrow in such manner that the ground is levelled off.

The basket 89 is bottomless and is drawn along upon the ground; at the sides are the panels or flaps 125 which are mounted upon pivoting arms 126 and are thus enabled to rise and descend according to the nature of the ground. The said basket is closed at the rear by a vertical rake 91 mounted upon a frame 92 which may be raised with a regular and periodic motion as the machine travels forward.

For this purpose, the said frame 92 is secured to a lever 93 mounted on one arm 94a of a rocking lever 94 which is pivoted horizontally upon the main frame of the machine. The other branch 94b of the rocking lever 94 carries a pivoted arm 95 adapted for horizontal motion and secured to the said rocking lever in the vertical plane. The said arm 95 is engaged below a worm 96 keyed to the shaft 97 of the wheel 37 which serves as a driving wheel when in contact with the ground.

The worm 96 effects a horizontal angular displacement of the arm 95 above a guide 100 and towards the gear wheel 38 actuating the disk 40. To reduce wear, the arm is preferably provided with a roller 123 which is in contact with the guide 100. The arm also carries a roller 124 cooperating with a cam 102 secured to the gear wheel 39. A reaction spring 103, attached to the arm 94b of the rocking lever 94, urges the arm 95 into its initial position (Fig. 2a).

The operation is as follows. When the crank axle 64 is lowered, the apparatus is in the road position, and when travelling, it imparts no motion to the mechanical parts. When the operator uses the lever 85 to lower the arch of the axle and the back part of the apparatus, the wheel 37 makes contact with the ground, and this wheel now serves as a driving wheel due to the travel of the machine, and it thus actuates the shaft 97 upon which it is mounted.

The shaft 97 drives the worm 96 and hence, by means of the wheel 39, the discharging device 40 which delivers the beets, when pulled up, into the basket 89 which rests upon the ground and serves as a shaking device by which the beets are freed from all adhering earth. The beets are collected in the basket 89 in which they are normally retained by the rake 91, mounted on the rocking lever 94 whose arm 95 is engaged with the worm 96. The said arm 95 is drawn forward by the screw 96 and thus moves toward the wheel 38 until the cam 102 meets the roller 124, thus separating the said arm from the worm 96 and bringing it below the guide 100, hence pivoting the said rocking lever 94 and lifting the rake 91. The beets contained in the basket 89 are thus left in piles on the ground by the machine, while the arm 95, pivoting at 95a under the action of the spring 103, slides below the guide 100 and resumes its original position on the worm 96, and the rake 91 again drops by its own weight; the cycle again commences, and at a frequency proportional to the speed of travel of the machine.

Due to these various combinations, the beets are pulled up and are arranged in piles, and can thus be readily collected, and the beet-transporting vehicles are allowed to pass with facility between the piles.

If in the case of rain, or for other reasons, a rake cannot be used, the said rake is lifted up, and a separator 130 is employed to dispose the beets in line on the ground without mixing them with the stalks.

A counterweight 124a is movable on the lever 93 carrying the rake, and thus the pressure of the rake upon the ground can be regulated at will.

I claim:

1. In a beet-pulling and stalk-cutting machine: a main frame; a pivoting fork provided with a vehicle wheel mounted at the front part of said frame; a crank axle provided with two vehicle wheels and at the rear part of said frame; controlling means for inclining said axle with reference to the frame; means for fastening said axle in any desired position; knife-guides and a stalk-cutting blade mounted on a frame pivoted to the main frame; means connecting said pivoted frame to the device controlling the inclination of said vehicle axle, a separator provided with a grating disposed back of the cutting blade and obliquely with reference to the center line of the machine; a rotatable toothed drum situated back of the said separator; beet-pulling blades; a horizontal rotatable disk carrying curved teeth on its periphery disposed back of the said pulling blades and adapted to receive the beets; a separator cooperating with said disk and adapted to convey the beets to the rear; a bottomless basket dragging upon the ground and adapted to receive the beets; and a transverse member vertically movable at the rear end of said basket.

2. In a beet-pulling and stalk cutting machine: a main frame; a pivoting fork provided with a vehicle wheel mounted at the front part of said frame; a crank axle provided with vehicle wheels and at the rear part of said frame; controlling means for inclining said axle with reference to the frame; means for fastening said axle in any desired position; knife-guides and a stalk-cutting blade mounted on a frame pivoted to the main frame; means connecting said pivoted frame to the device controlling the inclination of said vehicle axle, a separator provided with a grating disposed back of the cutting blade and obliquely with reference to the center line of the machine; a rotatable drum situated back of the said separator; beet-pulling blades; a horizontal rotatable disk carrying curved teeth on its periphery disposed back of the said pulling blades and adapted to receive the beets; a separator cooperating with the said disk and adapted to convey the beets to the rear; a bottomless basket dragging upon the ground and adapted to receive the beets; and a transverse member vertically movable at the rear end of said basket, a transverse shaft journaled at the back part of the main frame, a sprocket wheel keyed to said shaft, and means by which the said drum and disk may be driven by said wheel.

3. In a beet-pulling and stalk-cutting machine; a main frame; a front wheel and axle element, and a crank axle with wheels, both mounted on said frame; knife guides and a stalk cutting knife disposed upon a structural frame which is pivotally mounted on the main frame, adjustable elastic means for braking the motion of said structural frame in both directions; a transverse shaft journaled at the back part of the frame; a sprocket wheel keyed to said shaft; beet-pulling blades; a horizontal disk actuated by said transverse shaft and adapted to convey the beets to the rear; two longitudinal members pivoted to the machine frame in the rear of said disk; and a rake having a transverse position at the ends of said longitudinal members.

4. In a beet-pulling and stalk-cutting machine; a main frame; a front wheel and axle element, and a crank axle with wheels, both mounted on said frame; knife guides and a stalk cutting knife disposed upon a structural frame which is pivotally mounted on the main frame, adjustable elastic means for braking the motion of said structural frame in both directions; a transverse shaft journaled at the back part of the vehicle frame; a sprocket wheel keyed to said shaft; beet-pulling blades; a horizontal disk actuated by said transverse shaft and adapted to convey the beets to the rear; two longitudinal members pivoted to the machine frame in the rear of said disk; a rake having a transverse position at the ends of said longitudinal members, a horizontal pivoted arm carrying the said rake; a worm disposed upon said transverse shaft; an arm secured to the first-mentioned arm as to vertical motion but movable separately in the horizontal direction, and engaged with said worm on the under side of the latter; a cam disposed upon the said transverse shaft, said cam being adapted to release the second-mentioned arm from the worm and to raise the first-mentioned arm vertically; a reaction spring urging the said second arm from the cam; and a guide which prevents said second arm from making contact with said worm when drawn back by the said spring.

In testimony whereof, I affix my signature.

FRANÇOIS CUVILLIER.